United States Patent
Kojima (10) Patent No.: US 7,658,360 B2
(45) Date of Patent: *Feb. 9, 2010

(54) SEAT SLIDING APPARATUS FOR VEHICLE

(75) Inventor: Yasuhiro Kojima, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 319 days.

This patent is subject to a terminal disclaimer.

(21) Appl. No.: 11/541,544

(22) Filed: Oct. 3, 2006

(65) Prior Publication Data

US 2007/0090260 A1  Apr. 26, 2007

(30) Foreign Application Priority Data

Oct. 24, 2005   (JP)   ............... 2005-308891

(51) Int. Cl.
    *F16M 13/00*   (2006.01)
(52) U.S. Cl. .............. 248/429; 248/424; 248/430; 296/65.13; 296/65.16; 297/340
(58) Field of Classification Search .......... 248/242–430
    See application file for complete search history.

(56) References Cited

U.S. PATENT DOCUMENTS

2007/0069098 A1 * 3/2007 Kojima ................. 248/429

FOREIGN PATENT DOCUMENTS

| JP | 11-286230 A | 10/1999 |
|----|-------------|---------|
| JP | 2001-047896 A | 2/2001 |

* cited by examiner

Primary Examiner—J. Allen Shriver, II
Assistant Examiner—Alaeddin Mohseni
(74) Attorney, Agent, or Firm—Buchanan Ingersoll & Rooney PC (57) ABSTRACT

A seat sliding apparatus for a vehicle includes a lower rail fixed to a vehicle floor, an upper rail fixed to a vehicle seat and supported by the lower rail so as to be movable relative thereto, and a lock mechanism. The lock mechanism includes multiple lock portions provided at the lower rail along a longitudinal direction thereof, a lock member provided at the upper rail and rotating about a rotation axis extending in a longitudinal direction of the upper rail so as to be engageable with or disengageable from the lock portions, and a bracket for supporting the lock member in a direction of the rotation axis. The seat sliding apparatus for a vehicle further includes a deflection preventing member for preventing a deflection of the bracket in the direction of the rotation axis and being integrally provided at the upper rail.

10 Claims, 8 Drawing Sheets

SEAT SLIDING APPARATUS FOR VEHICLE

CROSS REFERENCE TO RELATED APPLICATIONS

This application is based on and claims priority under 35 U.S.C. § 119 to Japanese Patent Application No. 2005-308891, filed on Oct. 24, 2005, the entire content of which is incorporated herein by reference.

FIELD OF THE INVENTION

This invention generally relates to a seat sliding apparatus for a vehicle.

BACKGROUND

Known seat sliding apparatuses for a vehicle are disclosed in JP2001-47896A and JP11-286230A. The seat sliding apparatus for a vehicle disclosed in JP2001-47896A includes a lower rail fixed to a vehicle floor, an upper rail fixed to a vehicle seat and supported by the lower rail so as to be movable relative thereto, and a lock mechanism. The lock mechanism includes multiple lock portions provided at the lower rail along a longitudinal direction thereof a lock member provided at the upper rail and rotatable about a rotation axis extending in a longitudinal direction of the upper rail so as to be engageable with or disengageable from the lock portions, and a bracket for supporting the lock member in a direction of the rotation axis. According to such seat sliding apparatus for a vehicle, a supported portion of the lock member is supported by a supporting portion of the bracket by means of a ball and the like. Thus, the bracket, the lock member, and the ball are arranged in a point contact manner, thereby reducing a rotation resistance of the lock member and restricting a movement of the lock member in the longitudinal direction of the upper rail. Accordingly, the lock member can rotate smoothly about the rotation axis and looseness of the lock member in the longitudinal direction of the upper rail can be prevented.

The seat sliding apparatus for a vehicle disclosed in JP11-286230A includes a lower rail fixed to a vehicle floor, an upper rail fixed to a vehicle seat and supported by the lower rail so as to be movable relative thereto, and a lock mechanism. The lock mechanism includes multiple lock portions provided at the lower rail along a longitudinal direction thereof, a spindle provided at the upper rail and having a rotation axis extending in a longitudinal direction of the upper rail, a lock member rotatable about the rotation axis and engageable with or disengageable from the lock portions, and a bracket for supporting the lock member in a direction of the rotation axis. According to such seat sliding apparatus for a vehicle, small projections are formed on opposing faces of the bracket with the lock member, respectively. At a time of assembling the bracket and the lock member, the projections are first overlapped and then riveted. Then, the lock member is rotated relative to the bracket, thereby forming an appropriate gap between the lock member and the bracket. That is, the lock member is slightly loose in a direction of the rotation axis. With this appropriate gap, a rotation resistance of the lock member can be minimized and a movement of the lock member in the longitudinal direction of the upper rail can be reduced to a certain level. Accordingly, the lock member can rotate smoothly about the rotation axis and looseness of the lock member in the longitudinal direction of the upper rail can be reduced to some extent.

However, according to the seat sliding apparatus for a vehicle disclosed in JP2001-47896A, a deflection of the bracket in the longitudinal direction (on an outer side and an inner side) of the upper rail is not completely restricted. For example, when an occupant swings a seat in the longitudinal direction of a vehicle or a small acceleration is applied to a seat while a vehicle is running, the bracket may slightly deflect, which may lead to uncomfortable seating.

Further, according to the seat sliding apparatus for a vehicle disclosed in JP11-286230A, the deflection of the bracket on an inner side thereof can be prevented by the spindle. However, the deflection of the bracket on an outer side thereof cannot be completely prevented. Thus, when an occupant swings a seat in the longitudinal direction of a vehicle or a small acceleration is applied to a seat while a vehicle is running, the bracket may slightly deflect, which may result in uncomfortable seating. Further, due to the gap provided in a direction of the rotation axis of the lock member, the looseness of the lock member cannot be completely prevented, thereby impeding comfortable seating.

Thus, a need exists for a seat sliding apparatus for a vehicle that can assure a comfortable seating feeling.

SUMMARY OF THE INVENTION

According to an aspect of the present invention, a seat sliding apparatus for a vehicle includes a lower rail fixed to a vehicle floor, an upper rail fixed to a vehicle seat and supported by the lower rail so as to be movable relative thereto, and a lock mechanism. The lock mechanism includes multiple lock portions provided at the lower rail along a longitudinal direction thereof a lock member provided at the upper rail and rotating about a rotation axis extending in a longitudinal direction of the upper rail so as to be engageable with or disengageable from the lock portions, and a bracket for supporting the lock member in a direction of the rotation axis. The seat sliding apparatus for a vehicle further includes a deflection preventing member for preventing a deflection of the bracket in the direction of the rotation axis and being integrally provided at the upper rail.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
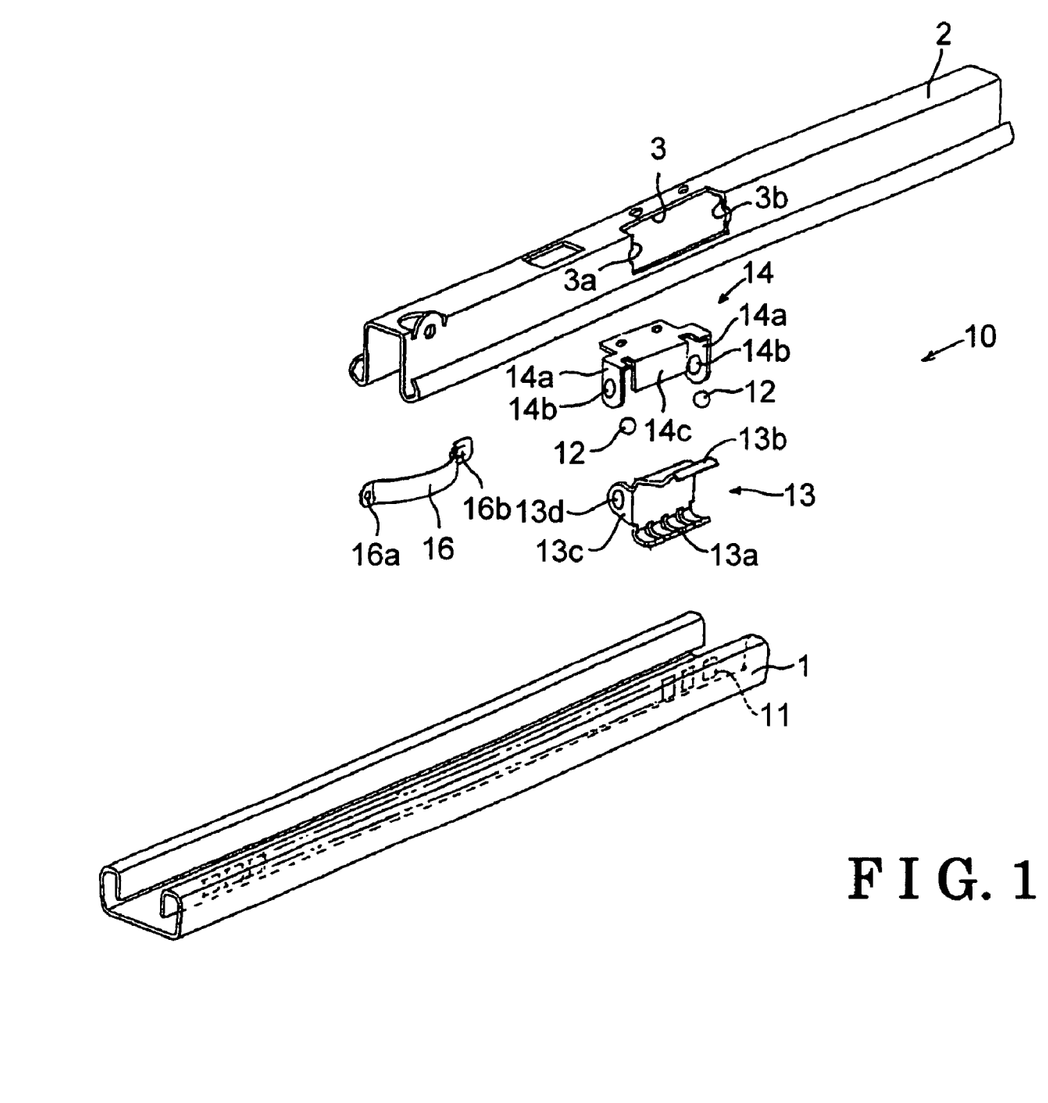
FIG. 1 is an exploded perspective view of a seat sliding apparatus for a vehicle according to a first embodiment of the present invention.
Figure 2:
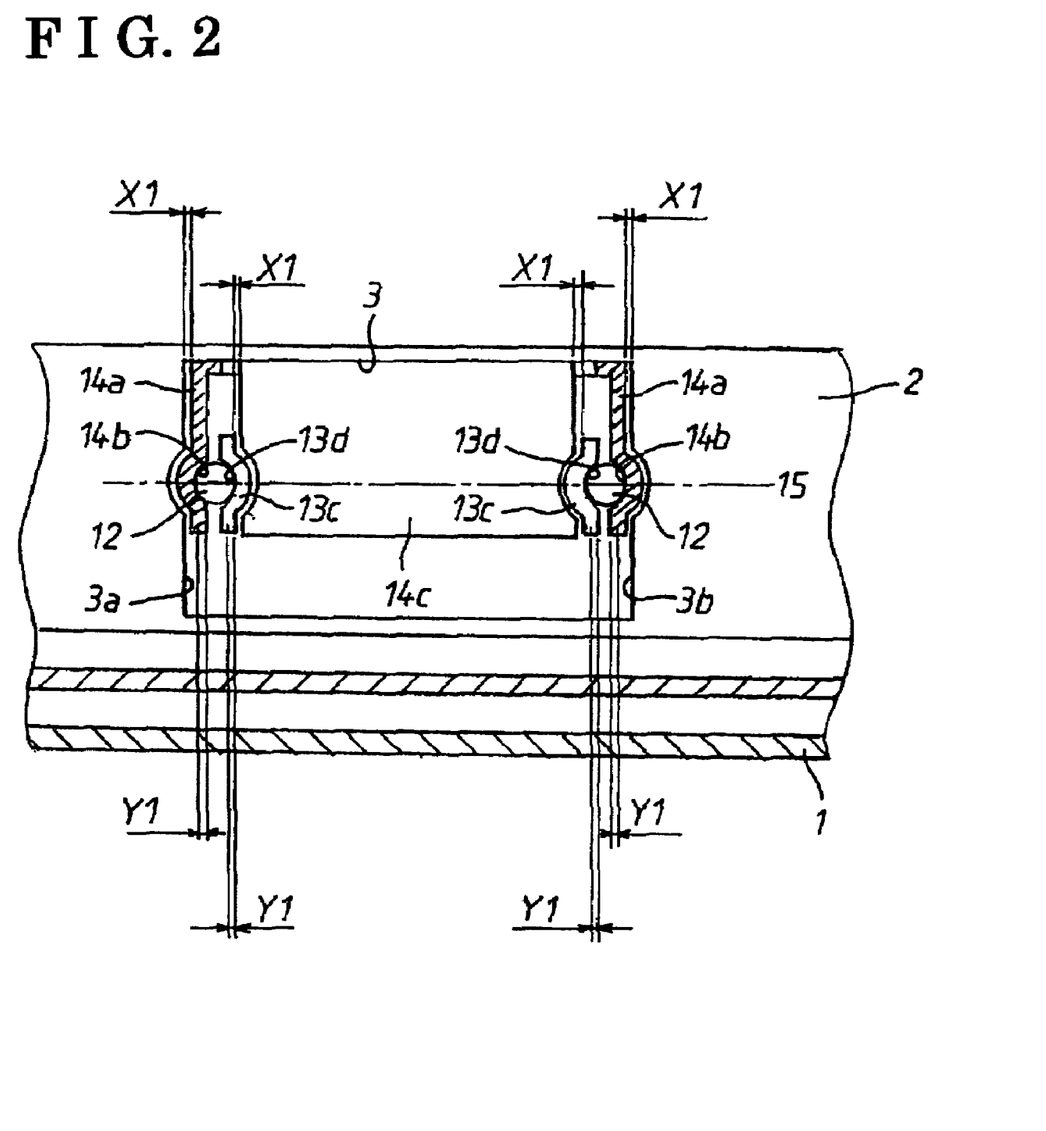
FIG. 2 is a partial cross-sectional view of the seat sliding apparatus for a vehicle according to the first embodiment of the present invention.
Figure 10:
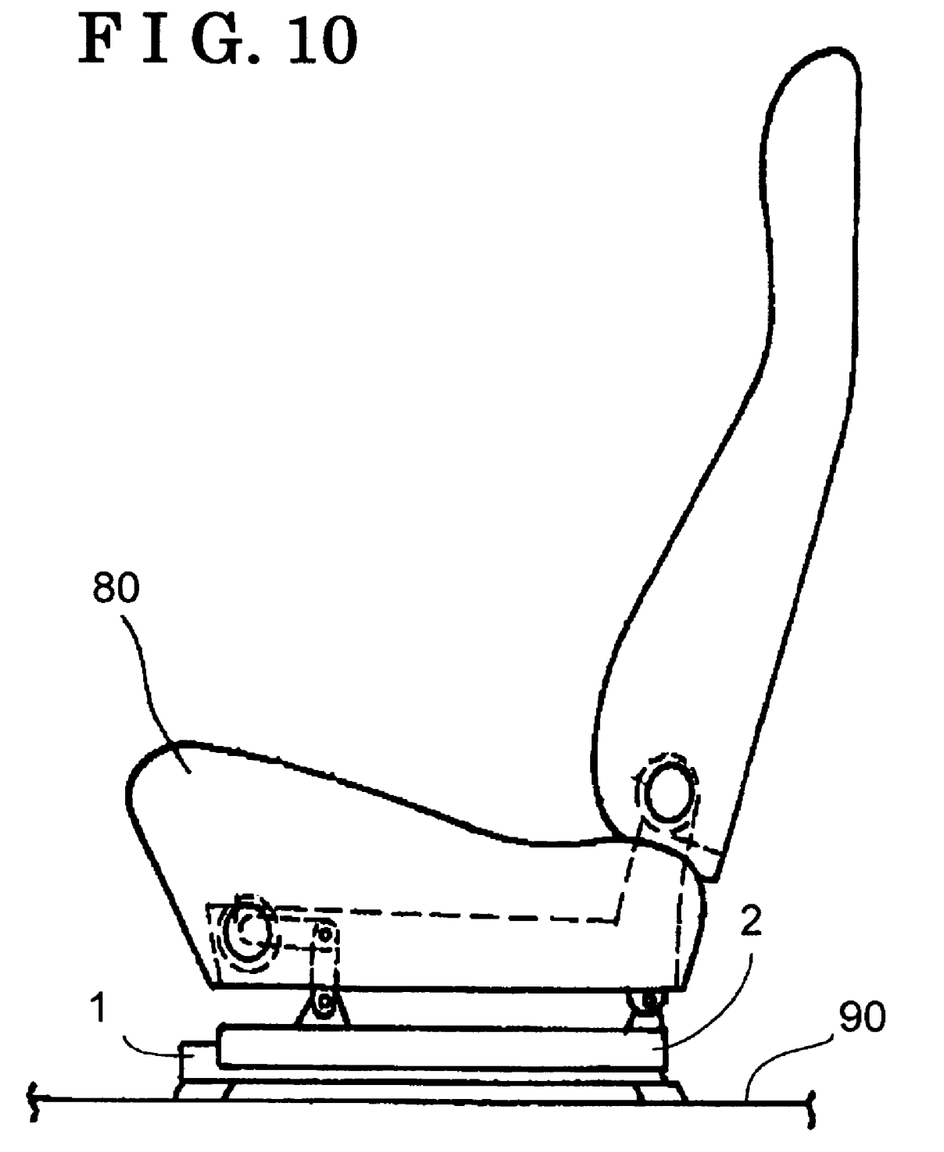
FIG. 10 is a whole side view of a vehicle seat.

Embodiments of the present invention will be explained with reference to the attached drawings. FIGS. 1 and 2 show a seat sliding apparatus for a vehicle according to a first embodiment. The seat sliding apparatus for a vehicle includes a pair of lower rails 1 fixed to a vehicle floor 90 on both sides in a width direction, respectively, and a pair of upper rails 2 fixed to a vehicle seat 80 on both sides in the width direction, respectively and supported by the lower rails 1 so as to be movable relative thereto in a vehicle longitudinal direction as shown in FIG. 10. Further, as shown in FIGS. 1 and 2, the seat sliding apparatus for a vehicle includes a lock mechanism 10 provided between each lower rail 1 and each upper rail 2. In FIG. 1, only the upper rail, the lower rail, and the lock mechanism of a one side of the vehicle seat are illustrated. A similar arrangement exists on the other side of the vehicle seat.

Multiple lock bores 11 that constitute the lock mechanism 10 are formed on an inner side of each lower rail 1 along a longitudinal direction thereof. A hole 3 into which a lock lever 13 and a bracket 14 (to be explained later) are inserted is formed on the upper rail 2. End faces 3a and 3b serving as a deflection preventing means are formed on both ends of the hole 3, respectively, in a longitudinal direction thereof. The deflection preventing means can be integrally provided on the upper rail 2, i.e. a part of the upper rail 2 is constituted as the deflection preventing means, a member including the deflection preventing means is fixed to the upper rail 2 so as to be integrally formed therewith, or the like.

As shown in FIGS. 1 and 2, the lock mechanism 10 includes the lock bores 11 serving as a lock portion, balls 12, the lock lever 13 serving as a lock member, and the bracket 14. The lock lever 13 is rotatable about a rotation axis 15 extending in a longitudinal direction of the upper rail 2 as in a state in which the lock lever 13 is assembled onto the upper rail 2. Each ball 12 is of a rigid sphere that secures a smooth rotation of the lock lever 13 about the rotation axis 15 and that prevents looseness of the lock lever 13.

The lock lever 13 includes a lock hook portion 13a arranged on a lower side and engageable with or disengageable from the lock bores 11. Further, the lock lever 13 includes an interlock portion 13b arranged on an upper side. A pressing portion of an operation lever (not shown) that operates to rotate the lock lever 13 makes contact or engages with the interlock portion 13b. Two rotation plates 13c each serving as a supported portion as supported by the bracket 14 are integrally formed on both ends of the lock lever 13, respectively. Each rotation plate 13c includes a concave portion 13d having a hemispherical concave face with a radius of curvature greater than that of an outer peripheral sphere of the ball 12.

The bracket 14 is fixed to the upper rail 2 on an upper side of the lower rail 1. Two support plates 14a each serving as a supporting portion as supporting the lock lever 13 are integrally formed on both ends of the bracket 14, respectively. Each support plate 14a includes a concave portion 14b having a hemispherical concave face with a radius of curvature greater than that of the outer peripheral sphere of the ball 12. The concave portion 14b is formed so as to face the concave portion 13d of the rotation plate 13c. In addition, a deflection prevention plate 14c is integrally formed between both the support plates 14a of the bracket 14. That is, the deflection prevention plate 14c is integrally formed on the bracket 14, which is fixed to the upper rail 2, so as to face each rotation plate 13c.

Each ball 12 is sandwiched between the concave portion 14b of the support plate 14a and the concave portion 13d of the rotation plate 13c. Thus, the lock lever 13 is supported by the bracket 14 by means of the balls 12 and is rotatable about the rotation axis 15 extending in the longitudinal direction of the upper rail 2.

A plate spring 16 is arranged within sections of the rails 1 and 2. The plate spring 16 includes a fitting bore 16a at one end, by means of which the plate spring 16 is fixed to the upper rail 2. Further, the plate spring 16 includes an elongated bore 16b at the other end, by means of which the plate spring 16 is movable in the longitudinal direction of the upper rail 2. The plate spring 16 includes an arc-shaped bent portion on a center, by means of which the plate spring 16 makes contact or engages with the lock lever 13 and biases the lock lever 13 in a direction in which the lock hook portion 13a engages with the lock bores 11.

According to the first embodiment having the aforementioned structure, the end faces 3a and 3b of the hole 3 and the deflection prevention plate 14c of the bracket 14 are provided so as to face the support plates 14a of the bracket 14 and the rotation plates 13c of the lock lever 13. Thus, the deflection of the bracket 14 in the longitudinal direction of the upper rail 2 (on an outer side and an inner side) can be prevented. Further, according to the seat sliding apparatus for a vehicle of the present embodiment, the concave portion 14b of the support plate 14a, the concave portion 13d of the rotation plate 13c, and the ball 12 are arranged in a point contact manner. Thus, a comfortable seating feeling can be assured. As shown in FIG. 2, the support plates 14a of the bracket 14 face the end faces 3a and 3b, respectively, while each having a gap X1 therebetween. In addition, the rotation plates 13c of the lock lever 13 face end faces of the deflection prevention plate 14c of the bracket 14, respectively, while each having a gap X2 therebetween. At this time, each depth of the concave portion 14b of the support plate 14a and the concave portion 13d of the rotation plate 13c is defined as Y1. The depth Y1 indicates a minimum amount of deflection by which the lock lever 13 disengages from the bracket 14. According to the present embodiment, a relationship of X1<Y1 is established. Thus, even if the bracket 14 or the lock lever 13 is deflected, disengagement of the ball 12 can be prevented. The dimensions of the respective gaps X1 can be equal to each other or different from each other.

Figure 3:
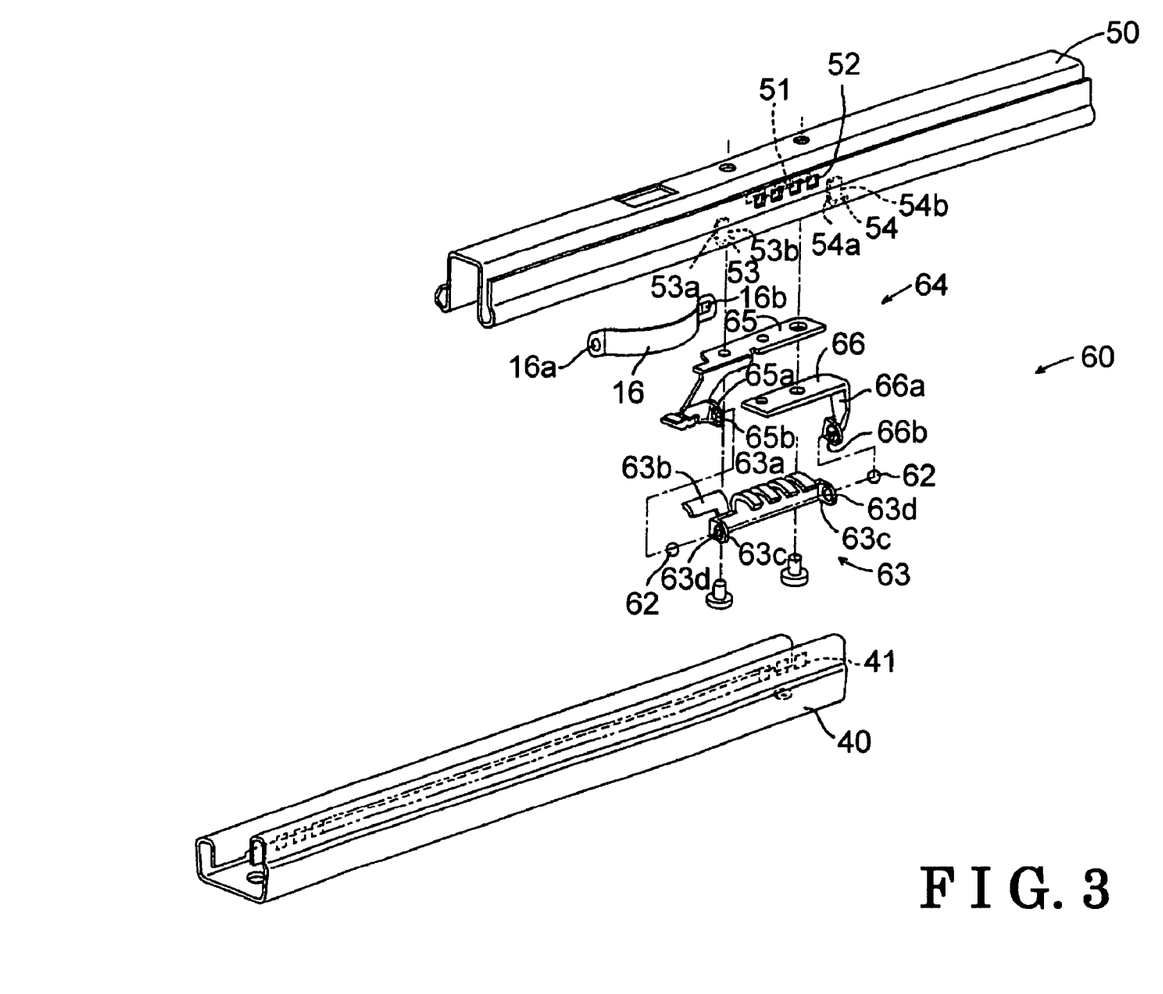
FIG. 3 is an exploded perspective view of the seat sliding apparatus for a vehicle according to a second embodiment of the present invention.
Figure 4:
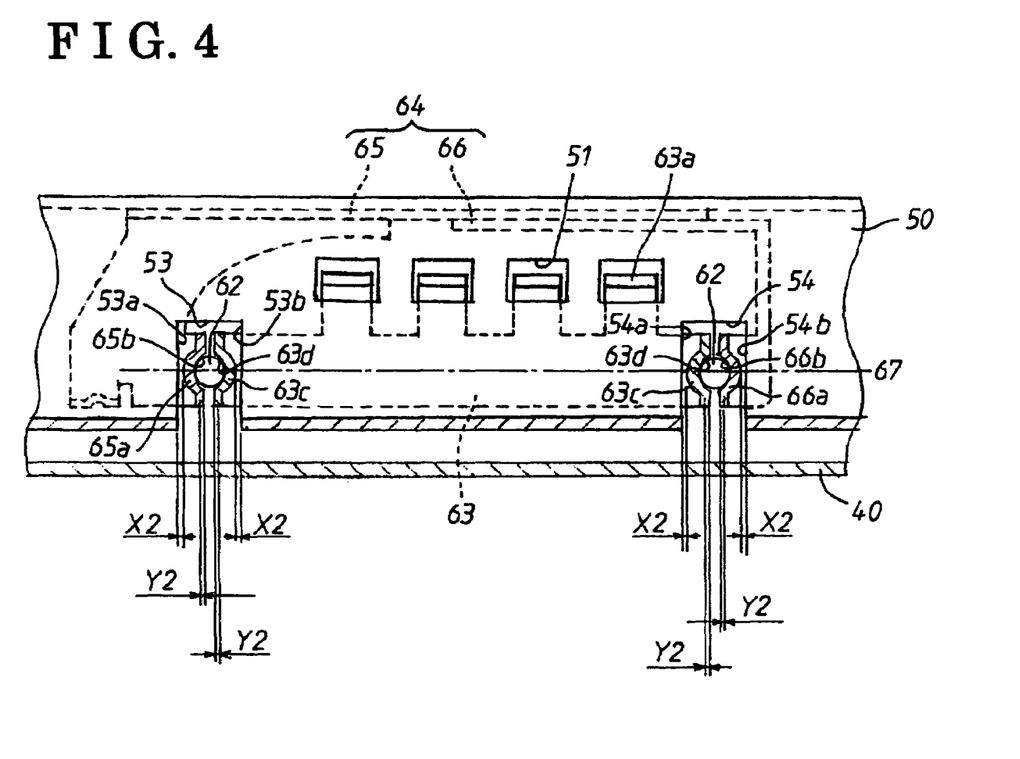
FIG. 4 is a partial cross-sectional view of the seat sliding apparatus for a vehicle according to the second embodiment of the present invention.

FIGS. 3 and 4 show the seat sliding apparatus for a vehicle according to a second embodiment. The seat sliding apparatus for a vehicle includes a pair of lower rails 40 fixed to a vehicle floor 90 on both sides in a width direction, respectively, a pair of upper rails 50 fixed to a vehicle seat 90 on both sides in the width direction, respectively, and supported by the lower rails 40 so as to be movable relative thereto in a vehicle longitudinal direction, and a lock mechanism 60 provided between each lower rail 40 and each upper rail 50. The parts or components having the same structure as that of the first embodiment bear the same numbers as the first embodiment and thus explanation is omitted.

Multiple lock bores 41 that constitute the lock mechanism 60 are formed on an inner side of each lower rail 40 along a longitudinal direction thereof. The upper rail 50 includes holes 51 and 52 that are able to face the lock bores 41 on an inner side or an outer side of the lower rail 40. In addition, the upper rail 50 includes holes 53 and 54 into which a rotation plate 63c of a lock lever 63, support plates 65a and 66a of a bracket 64, and balls 62 are inserted. End faces 53a and 53b serving as a deflection preventing means are formed on both ends of the hole 53, respectively, in a longitudinal direction of the upper rail 50 while end faces 54a and 54b serving as a deflection preventing means are formed on both ends of the hole 54, respectively, in the longitudinal direction of the upper rail 50.

As shown in FIGS. 3 and 4, the lock mechanism 60 includes the lock bores 41 serving as a lock portion, the holes 51 and 52, the balls 62, the lock lever 63 serving as a lock member, and the bracket 64. The lock lever 63 includes a rotation axis 67 extending in the longitudinal direction of the upper rail 50 as in a state in which the lock lever 63 is assembled onto the upper rail 50. The ball 62 is of a rigid sphere that secures a smooth rotation of the lock lever 63 about the rotation axis 67 and that prevents looseness of the lock lever 63.

The lock lever 63 includes a lock hook portion 63a on an upper side and engageable with or disengageable from the lock bores 41. In addition, the lock lever 63 includes an interlock portion 63b on a rear side. A pressing portion of an operation lever (not shown) that operates to rotate the lock lever 63 makes contact or engages with the interlock portion 63b. Two rotation plates 63c each serving as a supported portion as supported by the bracket 64 are integrally formed on both ends of the lock lever 63, respectively. Each rotation plate 63c includes a concave portion 63d having a hemispherical concave face with a radius of curvature greater than that of an outer peripheral sphere of the ball 62.

The bracket 64 includes a first bracket 65 and a second bracket 66 both of which are fixed to the upper rail 50 on an upper side of the lower rail 40. End portions of the first bracket 65 and the second bracket 66 are integrally formed with support plates 65a and 66a, respectively, serving as a supporting portion as supporting the lock lever 63. The support plates 65a and 66a include concave portions 65b and 66b, respectively, each having a hemispherical concave ace with a radius of curvature greater than that of an outer peripheral sphere of the ball 62 and each facing the concave portion 63d of the rotation plate 63c.

The balls 62 are sandwiched between the concave portion 65b of the support plate 65a and one of the concave portion 63d of the rotation plate 63c, and between the concave portion 66b of the support plate 66a and the other one of the concave portion 63d of the rotation plate 63c, respectively. Thus, the lock lever 63 is supported by the bracket 64 by means of the balls 62 and is rotatable about the rotation axis 67 extending in the longitudinal direction of the upper rail 50.

According to the seat sliding apparatus for a vehicle having the aforementioned structure, the end faces 53a and 53b, and the end faces 54a and 54b are formed on the holes 53 and 54, respectively, so as to face the support plates 65a and 66a of the bracket 64 and the rotation plates 63c of the lock lever 63. Thus, deflection of the bracket 64 in the longitudinal direction of the upper rail 50 (on an outer side and an inner side) can be prevented. In addition, since the concave portions 65b and 66b of the support plates 65a and 66a, respectively, the concave portions 63d of the rotation plate 63c, and the balls 62 are arranged in a point contact manner, the movement of the lock lever 63 in the longitudinal direction of the upper rail 5 can be restricted, thereby preventing looseness of the lock lever 63. The comfortable seating feeling can be secured.

As shown in FIG. 4, the support plates 65a and 66a of the bracket 64 face the end faces 53a and 54b of the holes 53 and 54, respectively, while each having a gap X2 therebetween. In addition, the rotation plates 63c of the lock lever 63 face the end faces 53b and 54a of the holes 53 and 54, respectively, while each having the gap X2 therebetween. At this time, each depth of the concave portion 65b or 66b of the support plates 65a or 66a, and the concave portion 63d of the rotation plate 63c is defined as Y2. The depth Y2 indicates a minimum amount of deflection by which the lock lever 63 disengages from the bracket 64. According to the present embodiment, a relationship of X2<Y2 is established. Thus, even if the bracket 64 or the lock lever 63 is deflected, disengagement of the balls 62 can be prevented. The dimensions of the respective gaps X2 can be equal to each other or different from each other.

Figure 5:
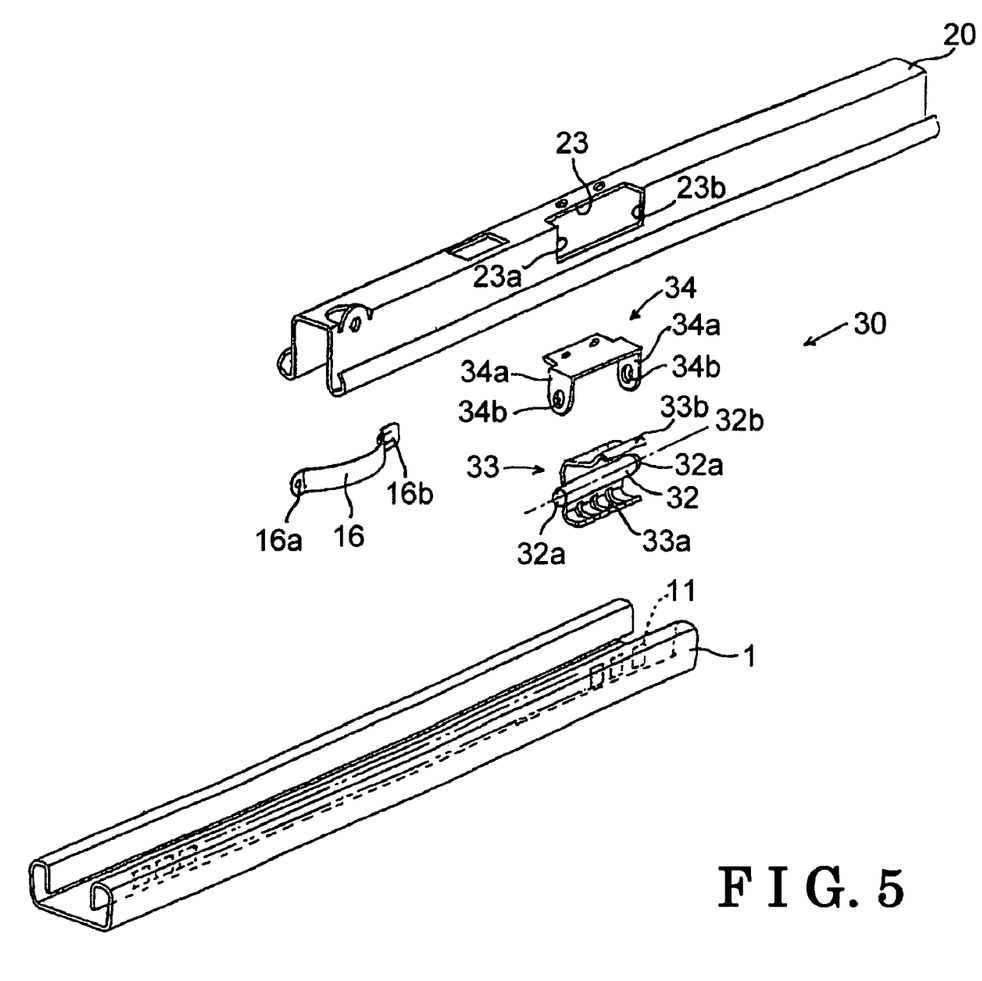
FIG. 5 is an exploded perspective view of the seat sliding apparatus for a vehicle according to a third embodiment of the present invention.
Figure 6:
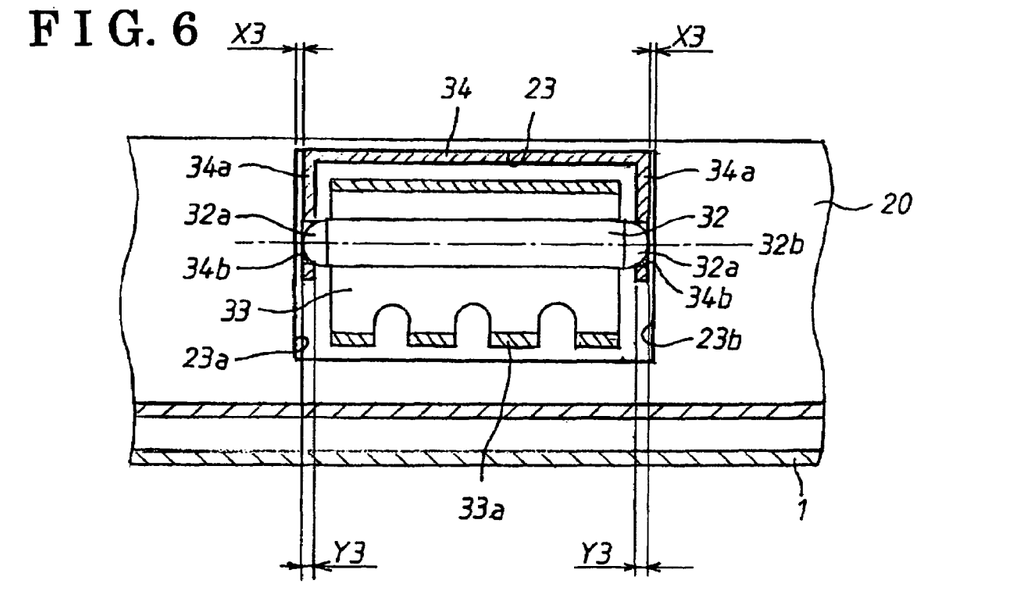
FIG. 6 is a partial cross-sectional view of the seat sliding apparatus for a vehicle according to the third embodiment of the present invention.
Figure 7A:
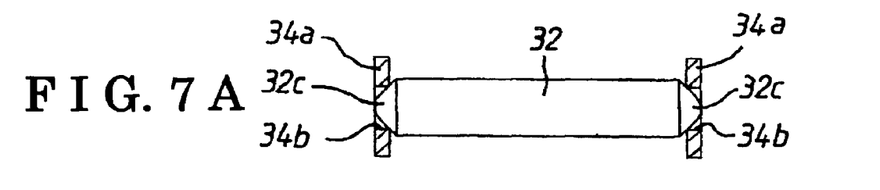
FIGS. 7A, 7B, 7C, and 7D are cross-sectional views each showing a relationship between a spindle and a bracket according to another variation of the third embodiment.
Figure 7B:
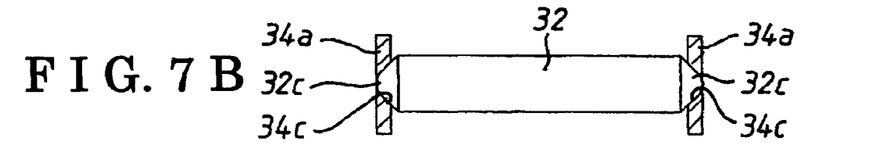
Figure 7C:
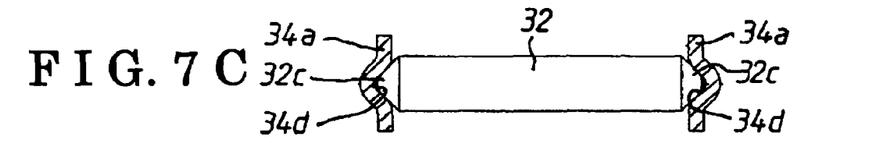
Figure 7D:
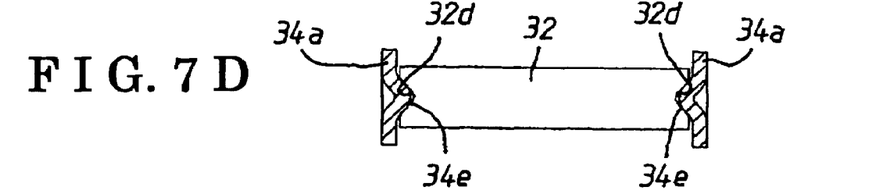

FIGS. 5 and 6 show the seat sliding apparatus for a vehicle according to a third embodiment. The seat sliding apparatus for a vehicle includes a pair of lower rails 1 fixed to a vehicle floor 90 on both sides in a width direction, respectively, a pair of upper rails 20 fixed to a vehicle seat 80 on both sides in the width direction, respectively, and supported by the lower rails 1 so as to be movable relative thereto in a vehicle longitudinal direction, and a lock mechanism 30 provided between each lower rail 1 and each upper rail 20. The parts or components having the same structure as that of the first embodiment bear the same numbers as the first embodiment and thus explanation is omitted.

As shown in FIG. 5, the upper rail 20 includes a hole 23 into which a lock lever 33 and a bracket 34 (to be explained later) are inserted. End faces 23a and 23b serving as a deflection preventing means are formed on both ends of the hole 23, respectively, in a longitudinal direction thereof.

The lock mechanism 30 includes lock bores 11 serving as a lock portion, a spindle 32, the lock lever 33 serving as a lock member, and the bracket 34. Hemispherical tapered faces 32a are formed on both ends of the spindle 32, respectively. The spindle 32 is connected to the lock lever 33 by welding. The lock lever 33 includes a rotation axis 32b extending in a longitudinal direction of the upper rail 20 as in a state in which the lock lever 33 is assembled onto the upper rail 20.

The lock lever 33 includes a lock hook portion 33a arranged on a lower side of the spindle 32 and engageable with or disengageable from the lock bores 11. Further, the lock lever 33 includes an interlock portion 33b arranged on an upper side of the spindle 32. A pressing portion of an operation lever (not shown) that operates to rotate the lock lever 33 engages with the interlock portion 33b.

The bracket 34 is fixed to the upper rail 20 on an upper side of the lower rail 1. Two support plates 34a each serving as a supporting portion as supporting the lock lever 33 are integrally formed on both ends of the bracket 44, respectively. Further, engagement bores 34b each serving as an engagement portion as engaging with the both end portions of the spindle 32 with no gaps therebetween are formed on the support plates 34a, respectively, so as to penetrate therethrough.

According to the seat sliding apparatus having the aforementioned structure, the end faces 23a and 23b are formed so as to face the support plates 34a of the bracket 34, respectively. Thus, the deflection of the bracket 34 in the longitudinal direction of the upper rail 20 (on an outer side) can be restricted. The deflection of the bracket 34 in the longitudinal direction of the upper rail 20 (on an inner side) can be restricted by the spindle 32. Further, the tapered faces 32a are formed on both ends of the spindle 32 so as to engage with the respective engagement bores 34b with no gaps therebetween.

Therefore, the movement of the lock lever 33 in the longitudinal direction of the upper rail 20 can be restricted, thereby preventing the looseness of the lock lever 33. The comfortable seating feeling can be ensured according to the third embodiment.

As shown in FIG. 6, the support plates 34a of the bracket 34 face the end faces 23a and 23b of the hole 23, respectively, while each having a gap X3 therebetween. At this time, a length from a tip end face of the spindle 32 to an inner surface of the support plate 34a is defined as Y3. The length Y3 indicates a minimum amount of deflection by which the lock lever 33 disengages from the bracket 34. According to the present embodiment, a relationship of X3<Y3 is established. Thus, even if the bracket 34 is deflected, disengagement of the lock lever 33 from the bracket 34 can be prevented. The dimensions of the respective gaps X3 can be equal to each other or different from each other.

Figure 8A:
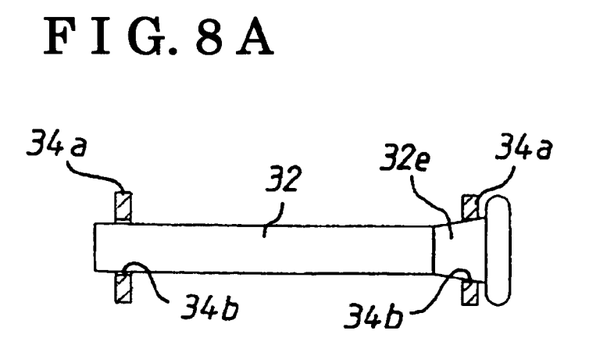
FIGS. 8A and 8B are cross-sectional views each showing a relationship between the spindle and the bracket according to another variation of the third embodiment.
Figure 8B:
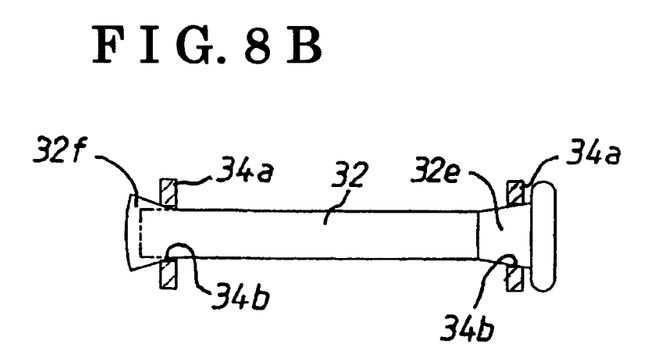
Figure 9A:
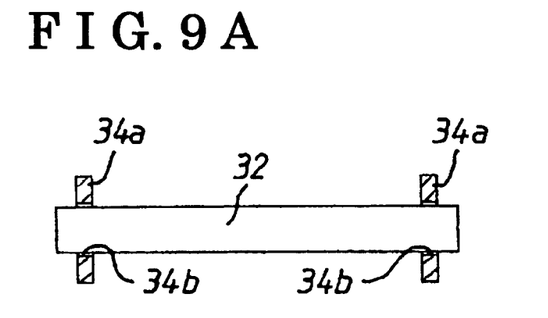
FIGS. 9A and 9B are cross-sectional views each showing a relationship between the spindle and the bracket according to another variation of the third embodiment.
Figure 9B:
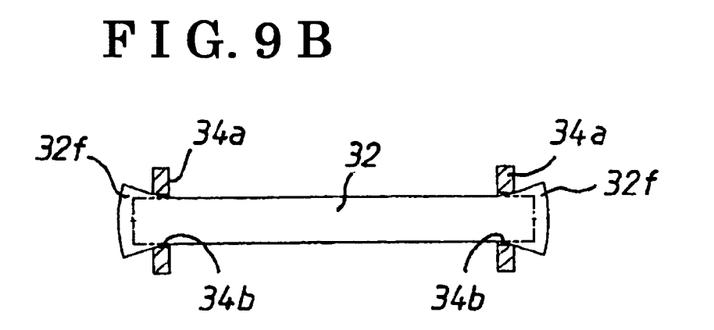

FIGS. 7 to 9 show the relationship between the both end portions of the spindle 32 and the engagement portions of the support plates 34a according to the other variations of the aforementioned third embodiment. In FIG. 7A, tapered faces 32c, each having a conical surface, are formed on both end portions of the spindle 32. In addition, engagement bores 34b are formed on both support plates 34a of the bracket 34 so as to penetrate therethrough. In FIG. 7B, the tapered faces 32c, each having a conical surface, are formed on both end portions of the spindle 32 while concave portions 34c each having a conical concave face are formed on both support plates 34a of the bracket 34. In FIG. 7C, the tapered faces 32c, each having a conical surface, are formed on both end portions of the spindle 32 while concave portions 34d each having a spherical concave face are formed on both support plates 34a of the bracket 34. In FIG. 7D, tapered faces 32d each having a spherical concave face are formed on both end portions of the spindle 32 while convex portions 34e each having a spherical convex face are formed on both support plates 34a of the bracket 34.

Further, as shown in FIGS. 8A and 8B, tapered faces 32e and 32f are formed on both end portions of the spindle 32 in such a manner that a diameter of each tapered face is gradually lager towards a tip end portion. The engagement bore 34b is formed on each support plate 34a of the bracket 34 so as to penetrate therethrough. In this case, as shown in FIG. 8A, the spindle 32 having the tapered face 32e at one end only is inserted into the engagement bore 34b of the support plate 34a. Then, as shown in FIG. 8B, the tapered face 32f is formed on the other end of the spindle 32.

In FIG. 9, the tapered faces 32f each diameter of which is gradually larger towards a tip end portion are formed on both end portions of the spindle 32. In addition, the engagement bore 34b is formed on each support plate 34a of the bracket 34 so as to penetrate therethrough. In this case, as shown in FIG. 9A, the spindle 32 having a column shape is inserted into the engagement bore 34b of the support plate 34a. Then, as shown in FIG. 9B, the tapered faces 32f are formed on both end portions of the spindle 32.

According to the aforementioned first to third embodiments, the end faces 3a, 3b, 23a, 23b, 53a, 53b, 54a, and 54b are integrally provided on the upper rail 2, 30, and 50 so as to prevent the deflection of the bracket 14, 34, and 64 i a direction of the rotation axis 15, 32b, and 67. Thus, the deflection of the bracket 14, 34, and 64 in the longitudinal direction of the upper rail 2, 30, and 50 can be prevented. Even if an occupant in a vehicle shakes a seat in a longitudinal direction of a vehicle or a small acceleration is applied to a seat while a vehicle is running, the deflection of the bracket 14, 34, and 64 can be prevented. Comfortable seating can be ensured accordingly.

In addition, according to the aforementioned first and second embodiments, the end faces 3a, 3b, 53a, 53b, 54a, and 54b are integrally provided on the upper rail 2 and 50 so as to face the support plates 14a, 65a, and 66a of the bracket 14 and 64 and the rotation plates 13c and 63c of the lock portion 13 and 63. Thus, the deflection of the bracket 14 and 64 in the longitudinal direction of the upper rail 2 and 50 (on an inner side and an outer side) can be restricted; thereby achieving comfortable seating.

Further, according to the aforementioned first embodiment, the deflection of the support plates 14a of the bracket 14 can be restricted by the deflection prevention plate 14c provided on the bracket 14 via the rotation plates 13c of the lock member 13.

Furthermore, according to the aforementioned third embodiment and the other variations thereof the tapered faces 32a and 32c are formed on both end portions of the spindle 32 while the engagement bores 34b, the concave portions 34c and 34d, and the convex portions 34e engaging with the both end portions of the spindle 32 with no gaps therebetween are formed on the bracket 34. Thus, the movement of the lock member 30 in the longitudinal direction of the upper rail 20 is restricted, thereby preventing the looseness of the lock member 30.

Even further, according to the aforementioned third embodiments and the other variations thereof, the deflection of the bracket 34 on the outer side can be restricted by the end faces 23a and 23b provided so as to face the support plates 34a of the bracket 34. The deflection of the bracket 34 on the inner side can be restricted by the spindle 32.

Furthermore, according to the aforementioned first to third embodiments, the both end faces of the hole 3, 23, 53, and 54 in a direction of the rotation axis 15, 32b, and 67 are provided as the deflection preventing means. Thus, a member is not additionally required for the deflection preventing means, thereby reducing manufacturing costs.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat sliding apparatus for a vehicle, comprising:
   a lower rail fixed to a vehicle floor;
   an upper rail fixed to a vehicle seat and supported by the lower rail so as to be movable relative thereto;
   a lock mechanism including multiple lock portions provided at the lower rail along a longitudinal direction thereof, a lock member provided at the upper rail and rotating about a rotation axis extending in a longitudinal direction of the upper rail so as to be engageable with or disengageable from the lock portions, and a bracket for supporting the lock member in a direction of the rotation axis; and a deflection preventing means for preventing a deflection of the bracket in the direction of the rotation axis, the deflection preventing means being integrally provided at the upper rail.

2. A seat sliding apparatus for a vehicle, comprising:
a lower rail fixed to a vehicle floor;
an upper rail fixed to a vehicle seat and supported by the lower rail so as to be movable relative to the lower rail;
a plurality of spaced apart lock bores in the lower rail;
a bracket mounted on the upper rail and comprising supporting portions;
a lock member supported on the bracket and rotatable about a rotation axis extending in a longitudinal direction of the upper rail to engage with the lock bores to lock the upper and lower rails relative to one another or disengage from the lock bores to permit relative movement between the upper and lower rails;
the lock member comprising supported portions, each of the supported portions of the lock member being supported on one of the supporting portions of the bracket so that the lock member is supported on the bracket; and
deflection preventing means for preventing deflection of the bracket in the direction of the rotation axis, one portion of the deflection preventing means being integrally provided at the upper rail and facing the supporting portions on the bracket and an other portion of the deflection preventing means facing the supported portions of the lock member.

3. A seat sliding apparatus for a vehicle according to claim 2, wherein the upper rail comprises a through hole possessing end faces, the end faces of the through hole constituting the one portion of the deflection preventing means, the bracket comprising a plate positioned between the supporting portions, the plate constituting the other portion of the deflection preventing means.

4. A seat sliding apparatus for a vehicle according to claim 2, further comprising a ball positioned between each supporting portion and the supported portion which is supported by the supporting portion.

5. A seat sliding apparatus for a vehicle according to claim 1, wherein the deflection preventing means faces a supporting portion on the bracket that supports the lock member and also faces a supported portion on the lock member that is supported by the bracket.

6. A seat sliding apparatus for a vehicle according to claim 5, wherein the deflection preventing means is provided at the bracket fixed to the upper rail so as to face the supported portion.

7. A seat sliding apparatus for a vehicle according to claim 1, wherein the lock member includes the rotation axis extending in the longitudinal direction of the upper rail and a spindle having tapered faces on both ends respectively while the bracket includes engagement portions engaging with both ends of the spindle with no gaps therebetween.

8. A seat sliding apparatus for a vehicle according to claim 7, wherein the deflection preventing means is provided at the upper rail so as to face a supporting portion of the bracket that supports the lock member.

9. A seat sliding apparatus for a vehicle according to claim 1, wherein the upper rail includes a hole in which the lock member is positioned; and the deflection preventing means being constituted by both end faces of the hole in the direction of the rotation axis.

10. A seat sliding apparatus for a vehicle according to claim 8, wherein the upper rail includes a hole in which the lock member is positioned; and the deflection preventing means being constituted by both end faces of the hole in the direction of the rotation axis.

* * * * *

UNITED STATES PATENT AND TRADEMARK OFFICE
CERTIFICATE OF CORRECTION

| | |
|---|---|
| PATENT NO. | : 7,658,360 B2 |
| APPLICATION NO. | : 11/541544 |
| DATED | : February 9, 2010 |
| INVENTOR(S) | : Yasuhiro Kojima |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 448 days.

Signed and Sealed this

Thirtieth Day of November, 2010

David J. Kappos
*Director of the United States Patent and Trademark Office*